United States Patent
Shiraishi et al.

(10) Patent No.: US 7,438,043 B2
(45) Date of Patent: Oct. 21, 2008

(54) INTERNAL COMBUSTION ENGINE WITH AUXILIARY COMBUSTION CHAMBER

(75) Inventors: Taisuke Shiraishi, Yokosuka (JP); Akihiko Kakuho, Yokosuka (JP); Eiji Takahashi, Yokosuka (JP); Morihiro Nagamine, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/581,347

(22) Filed: Oct. 17, 2006

(65) Prior Publication Data

US 2007/0089703 A1 Apr. 26, 2007

(30) Foreign Application Priority Data

Oct. 24, 2005 (JP) ............................ 2005-308019

(51) Int. Cl.
*F02B 19/18* (2006.01)
(52) U.S. Cl. .................. 123/260; 123/266; 123/291
(58) Field of Classification Search ................ 123/297, 123/260, 266, 268, 285–287, 291, 309
See application file for complete search history.

(56) References Cited

U.S. PATENT DOCUMENTS

| | | | | |
|---|---|---|---|---|
| 1,511,739 | A | * 10/1924 | McDowell | 123/169 PA |
| 4,029,075 | A | * 6/1977 | Noguchi et al. | 123/266 |
| 4,176,649 | A | * 12/1979 | Karlovitz | 123/263 |
| 4,452,189 | A | * 6/1984 | Latsch et al. | 123/143 B |
| 4,892,070 | A | * 1/1990 | Kuhnert | 123/274 |
| 4,930,473 | A | * 6/1990 | Dietrich | 123/266 |
| 5,105,780 | A | * 4/1992 | Richardson | 123/263 |
| 5,554,908 | A | * 9/1996 | Kuhnert et al. | 313/140 |
| 6,013,973 | A | * 1/2000 | Sato | 313/143 |
| 6,595,182 | B2 | * 7/2003 | Oprea et al. | 123/297 |
| 7,066,137 | B1 | * 6/2006 | Dawson | 123/266 |
| 7,082,920 | B2 | * 8/2006 | Robinet et al. | 123/260 |
| 7,104,245 | B2 | * 9/2006 | Robinet et al. | 123/254 |
| 7,210,447 | B2 | * 5/2007 | Robinet et al. | 123/255 |
| 7,216,623 | B2 | * 5/2007 | Teraji et al. | 123/256 |
| 7,243,634 | B2 | * 7/2007 | Tourteaux et al. | 123/261 |
| 2005/0000484 | A1 | * 1/2005 | Schultz et al. | 123/266 |
| 2005/0211217 | A1 | * 9/2005 | Boley et al. | 123/266 |
| 2006/0096571 | A1 | * 5/2006 | Tourteaux et al. | 123/266 |

FOREIGN PATENT DOCUMENTS

| | | |
|---|---|---|
| JP | H10-306725 A | 11/1998 |
| JP | 2001-227344 A | 8/2001 |
| JP | 2002-349265 | 12/2002 |

* cited by examiner

*Primary Examiner*—Hai H Huynh
(74) *Attorney, Agent, or Firm*—Global IP Counselors, LLP

(57) ABSTRACT

An internal combustion engine is provided that basically comprises a cylinder block, a cylinder head, a piston, an auxiliary chamber partition wall and a spark plug. The auxiliary chamber partition wall is coupled to the cylinder head and extending toward the main chamber to form an auxiliary combustion chamber inside an area enclosed by the auxiliary chamber partition wall. The auxiliary chamber partition wall has at least one jet aperture through which the auxiliary combustion chamber fluidly communicates with the main combustion chamber. A tip portion of the auxiliary chamber partition wall that faces toward the piston has a smaller wall thickness than other portion of the auxiliary chamber partition wall.

17 Claims, 6 Drawing Sheets

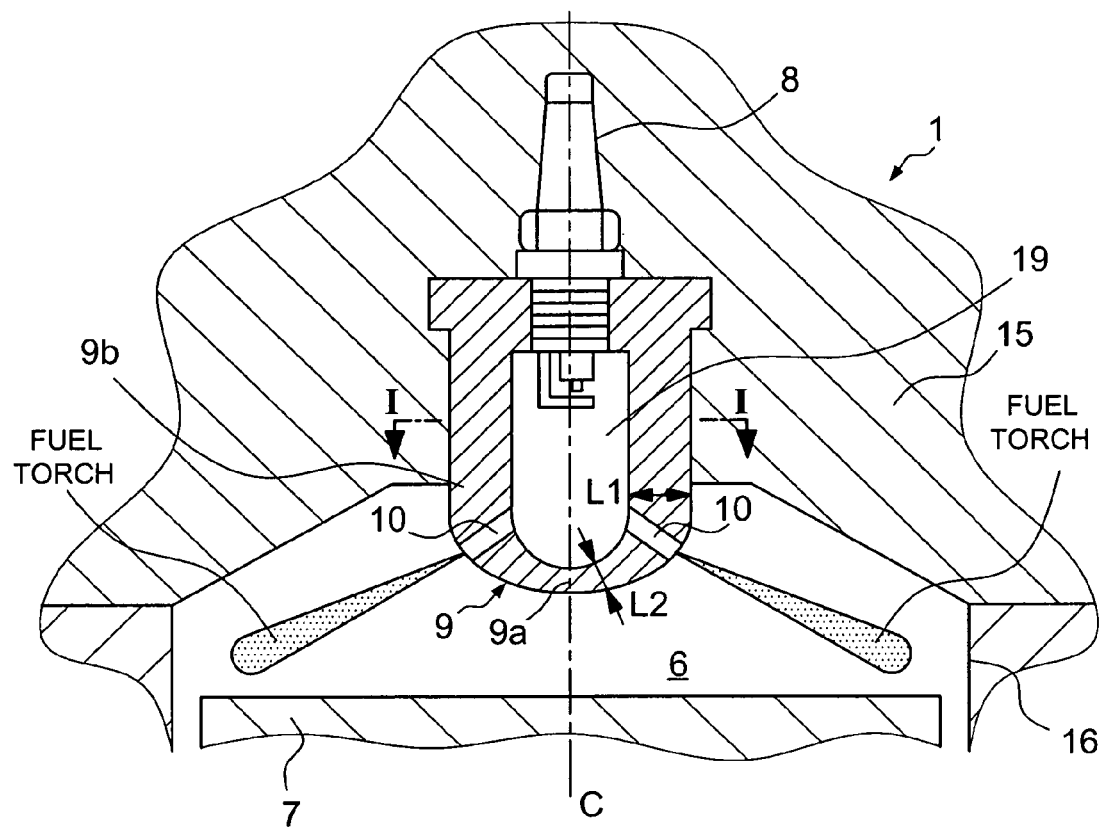

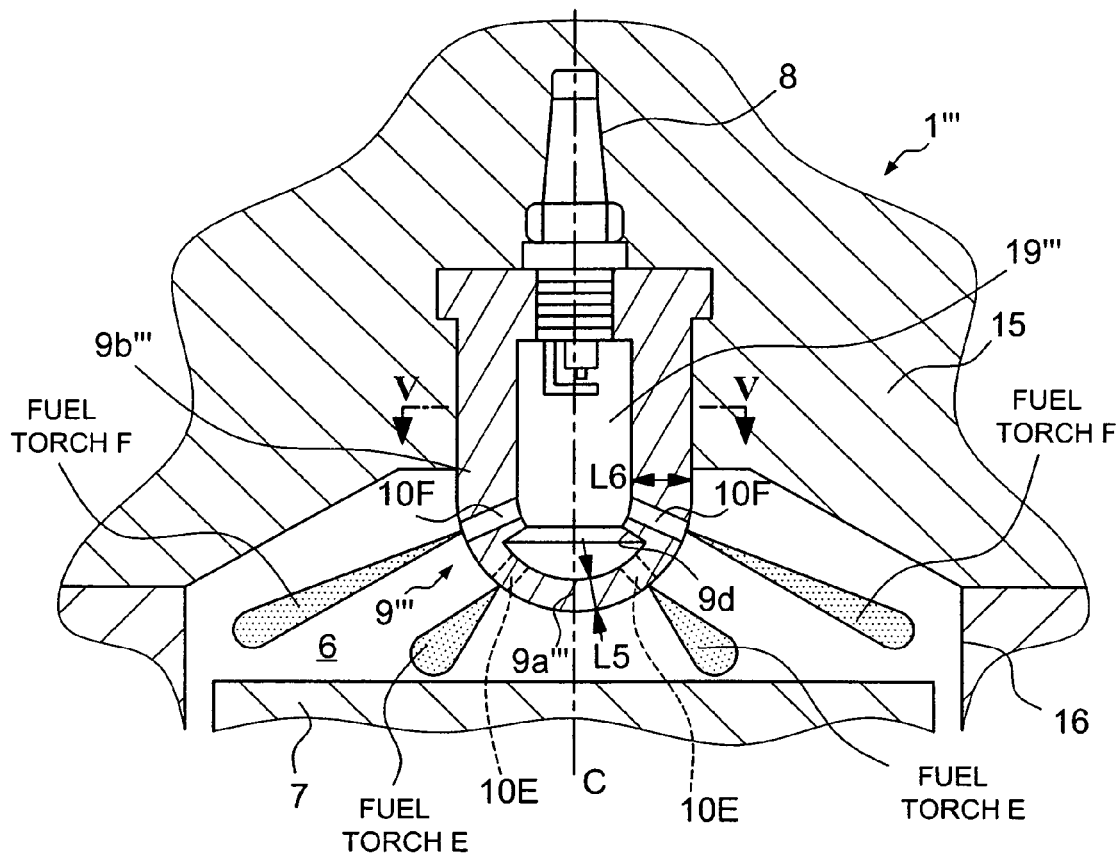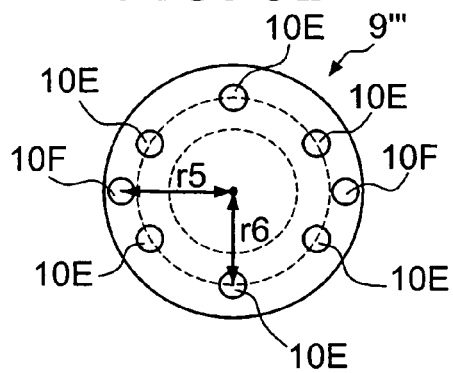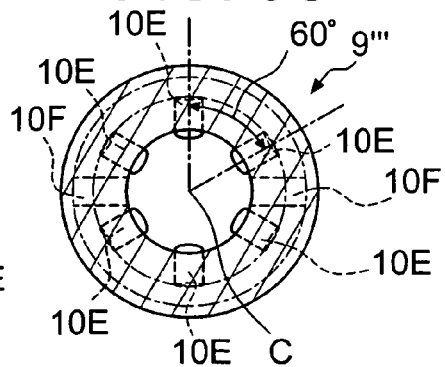

INTERNAL COMBUSTION ENGINE WITH AUXILIARY COMBUSTION CHAMBER

CROSS-REFERENCE TO RELATED APPLICATIONS

This application claims priority under 35 U.S.C. § 119 to Japanese Patent Application No.2005-308019, filed on Oct. 24, 2005. The entire disclosure of
Japanese Patent Application No.2005-308019 is hereby incorporated herein by reference.

BACKGROUND OF THE INVENTION

1. Field of the Invention

The present invention relates to an internal combustion engine with auxiliary combustion chamber. More specifically, the present invention relates to an internal combustion engine with auxiliary combustion chamber configured to prevent occurrences of premature ignition.

2. Background Information

In a conventional internal combustion engine provided with an auxiliary combustion chamber, there are problems that engine knocking is more likely to occur when temperature level inside a combustion chamber rises and an effective combustion control cannot be performed. Therefore, in such a conventional internal combustion engine, improvements in the maximum output power and the combustion efficiency are limited. Japanese Laid-Open Patent Publication No.2002-349265 discloses one example of a conventional internal combustion engine with an auxiliary combustion chamber arranged to solve the above mentioned problems. More specifically, this reference discloses the conventional internal combustion engine with the auxiliary combustion chamber arranged to prevent occurrence of knocking and to attain high output and high efficiency by providing a cylinder head having a recessed part to establish homogeneous distribution of combustion gas density and temperature within a combustion chamber.

In view of the above, it will be apparent to those skilled in the art from this disclosure that there exists a need for an improved internal combustion engine with auxiliary combustion chamber. This invention addresses this need in the art as well as other needs, which will become apparent to those skilled in the art from this disclosure.

SUMMARY OF THE INVENTION

In the conventional internal combustion engine described in the above mentioned reference, a thickness at a tip portion of a partition wall, which defines an auxiliary combustion chamber, is thicker than a thickness at a base portion of the partition wall where the partition wall is connected to a wall of a main combustion chamber (cylinder head). The tip portion of the auxiliary combustion chamber, which is protruding into the main combustion chamber, is exposed to high temperature combustion gas continually when driving with high engine load continues. However, with the conventional internal combustion engine with the auxiliary combustion chamber as described in the above mentioned reference, heat accumulates quickly at the tip portion of the partition wall because the tip portion with the relatively large wall thickness has relatively large thermal capacity which prevents an efficient thermal exchange between fresh intake air and the tip portion of the partition wall. As a result, the temperature of the tip portion of the partition wall rises because heating and cooling do not come to equilibrium.

Therefore, there is a risk that abnormal combustion occurs when the high load driving condition continues in the conventional internal combustion engine because temperature at the tip portion, in particular, of the partition wall becomes high, and premature ignition of the air-fuel mixture within the main combustion chamber takes place.

Accordingly, one object of the present invention is to provide an internal combustion engine with auxiliary combustion chamber that is configured to prevent abnormal combustion caused by premature ignition and the like in the high load driving region.

In order to achieve the above mentioned object, an internal combustion engine is provided that basically comprises a cylinder block, a cylinder head, a piston, an auxiliary chamber partition wall and a spark plug. The cylinder head disposed on an upper part of the cylinder block. The piston is disposed inside the cylinder block so that a main combustion chamber is defined by the cylinder head, the cylinder block and the piston. The auxiliary chamber partition wall is coupled to the cylinder head and extending toward the main chamber to form an auxiliary combustion chamber inside an area enclosed by the auxiliary chamber partition wall, with at least a portion of the auxiliary chamber partition wall that faces toward the piston having a smaller wall thickness than other portion of the auxiliary chamber partition wall. The auxiliary chamber partition wall has at least one jet aperture through which the auxiliary combustion chamber fluidly communicates with the main combustion chamber. The spark plug is configured and arranged to ignite air-fuel mixture within the auxiliary combustion chamber.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2A is an enlarged partial vertical cross sectional view of the internal combustion engine showing a shape of the auxiliary combustion chamber defined by an auxiliary chamber partition wall and shapes of fuel torches forced out from a plurality of jet apertures taken along a section line II-II in FIG. 2C in accordance with the first embodiment of the present invention;

FIG. 2B is a bottom plan view of the auxiliary chamber partition wall in accordance with the first embodiment of the present invention;

FIG. 2C is a transverse cross sectional view of the auxiliary combustion chamber taken along a section line I-I in FIG. 2A in accordance with the first embodiment of the present invention;

FIG. 5A is an enlarged partial vertical cross sectional view of an internal combustion engine showing a shape of an auxiliary combustion chamber defined by an auxiliary chamber partition wall and shapes of fuel torches forced out from a plurality of jet apertures in accordance with a fourth embodiment of the present invention;

FIG. 5B is a bottom plan view of the auxiliary chamber partition wall in accordance with the fourth embodiment of the present invention;

FIG. 5C is a transverse cross sectional view of the auxiliary combustion chamber taken along a section line V-V in FIG. 5A in accordance with the fourth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
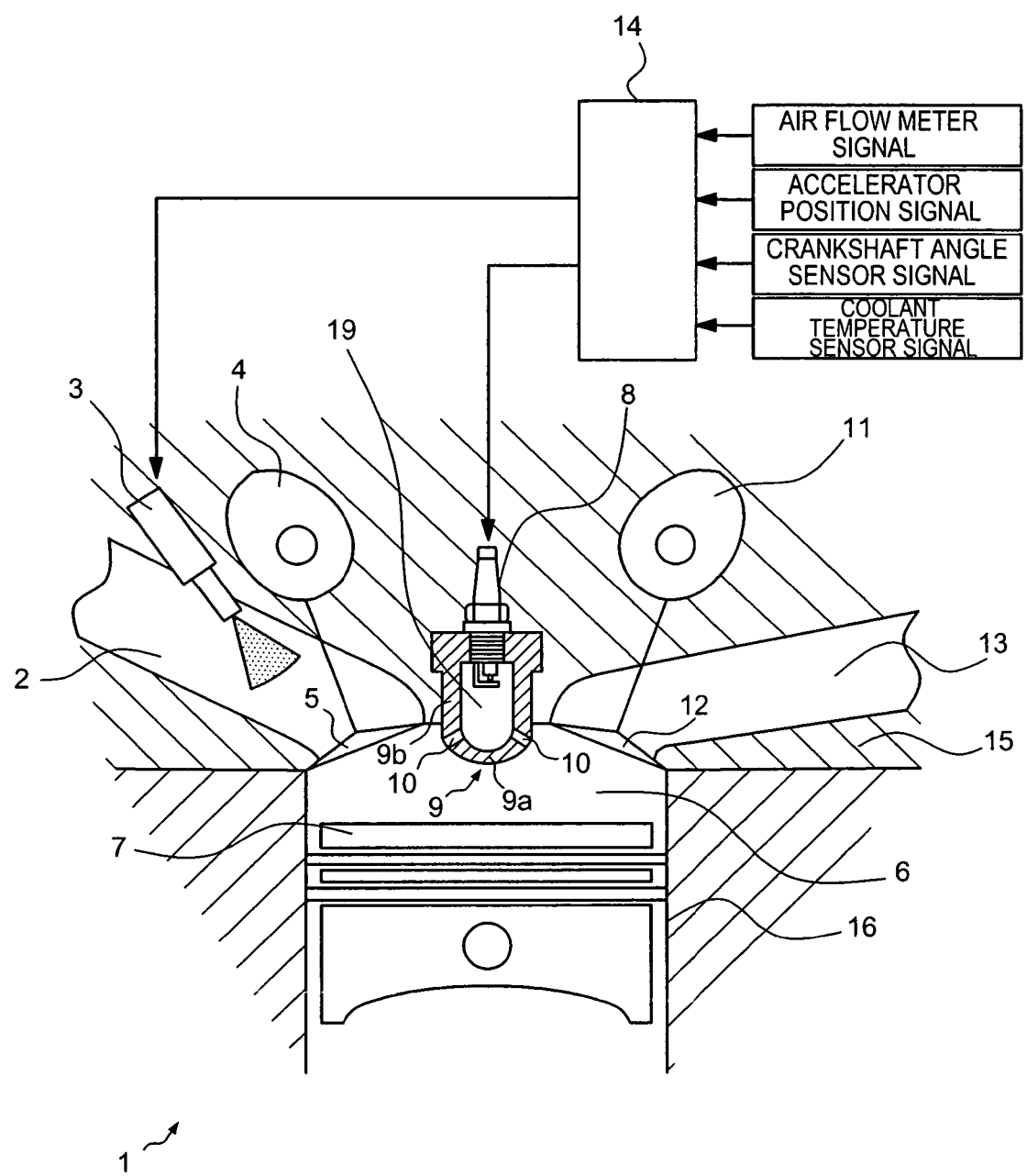
FIG. 1 is a partial vertical cross sectional view of an internal combustion chamber with an auxiliary combustion chamber in accordance with a first embodiment of the present invention.

Referring initially to FIGS. 1 and 2A-2C, an internal combustion engine 1 is illustrated in accordance with a first embodiment of the present invention. FIG. 1 is a vertical partial cross sectional view of the internal combustion engine 1 of the first embodiment. In this embodiment, the internal combustion engine 1 is arranged as, for example, a gasoline engine that uses gasoline as fuel. While only one cylinder of the internal combustion engine 1 is illustrated herein, it will be apparent to those skilled in the art that the internal combustion engine 1 has a plurality of similarly configured cylinders. As seen in FIG. 1, each cylinder of the internal combustion engine I basically comprises an intake port 2, a fuel injection valve 3, an intake cam 4, an intake valve 5, a main combustion chamber 6, a piston 7, a spark plug 8, an exhaust cam 11 and an exhaust valve 12, an exhaust port 13. A cylinder head 15 is fixedly secured to a cylinder block 16 to define the cylinders (only one cylinder shown in FIG. 1) with the cylinder head 15 having an auxiliary combustion chamber 19 (hereinafter referred as "auxiliary chamber") in accordance with the first embodiment of the present invention for each cylinder. The pistons 7 (only one shown in FIG. 1) are reciprocally mounted in the cylinder block 16. The fuel injection valves 3 (only one shown in FIG. 1) are configured and arranged to inject fuel into the intake ports 2. The intake valves 5 and the exhaust valves 12 are driven by the intake cams 4 and the exhaust cams 11, respectively. The exhaust gas is discharged from the exhaust ports 13.

Moreover, as seen in FIG. 1, the main combustion chamber 6 (hereinafter referred as "main chamber") of the internal combustion engine 1 is where a main combustion takes place, and the auxiliary chamber 19 is where an initial combustion takes place. The main chamber 6 is defined by the cylinder block 16, the piston 7, and the cylinder head 15. The auxiliary chamber 19 is defined by an auxiliary chamber partition wall 9. The auxiliary chamber partition wall 9 is arranged such that a volume or capacity of the auxiliary chamber 19 is smaller than a volume or capacity of the main chamber 6 as seen in FIG. 1. The spark plug 8 is arranged in an upper portion in the auxiliary chamber 19 adjacent to the cylinder head 15 and generally aligned concentrically with respect to a longitudinal center axis C (FIG. 2A) of the auxiliary chamber 19. The spark plug 8 is configured and arranged to ignite air-fuel mixture within the auxiliary chamber 19. Upon the ignition of the air-fuel mixture inside the auxiliary chamber 19, an air-fuel mixture within the auxiliary chamber 19 is combusted which causes the fuel torches to be produced in the main chamber 6. More specifically, the auxiliary chamber partition wall 9 has a plurality of jet apertures 10 fluidly communicating the main chamber 6 to the auxiliary chamber 19. In other words, the jet apertures 10 are provided in the auxiliary chamber partition wall 9 such that the auxiliary chamber 19 and the main chamber 6 are fluidly communicated through the jet apertures 10. Thus, the fuel torches occurred due to ignition of the air-fuel mixture inside the auxiliary chamber 19 by the spark plug 8 such that the fuel torches are projected from the auxiliary chamber 19 into the main chamber 6 through the jet apertures 10.

Moreover, the auxiliary chamber partition wall 9 has a tip portion 9a and a base portion 9b. The tip portion 9a protrudes toward the piston 7 and faces the piston 7. The base portion 9b is connected to the cylinder head 15 as shown in FIG. 1. In the first embodiment of the present invention, the tip portion 9a of the auxiliary chamber partition wall 9 has a smaller thickness than the base portion 9b of the auxiliary chamber partition wall 9. By forming the tip portion 9a of the auxiliary chamber partition wall 9 with a relatively thin thickness in comparison to the base portion 9b, the thermal capacity of the tip portion 9a can be made relatively small. Therefore, thermal exchange of the tip portion 9a with the surrounding area can readily occur to cool the tip portion 9a, and thus, abnormal combustion induced due to premature ignition and the like can be suppressed. The structure of the auxiliary chamber partition wall 9 including the tip portion 9a and the base portion 9b will be explained in more detail later.

The internal combustion engine 1 further includes an engine control unit 14 (ECU). The engine control unit 14 is configured to receive an air flow meter signal detected by an air flow meter, an accelerator position signal detected by an accelerator position sensor, a crankshaft angle sensor signal detected by a crankshaft angle sensor, and a coolant temperature sensor signal detected by a coolant temperature sensor, and the like. (These sensors are not shown in the drawings.) The engine control unit 14 is integrally configured to control the internal combustion engine 1 and to determine a fuel injection timing and a fuel injection amount based on the input signals. Moreover, the engine control unit 14 is configured to control operations of the fuel injection valve 3 and the spark plug 8 based on the calculated fuel injection timing and fuel injection amount.

Referring now to FIGS. 2A to 2C, a structure of the auxiliary chamber partition wall 9 will be explained in more detail. FIG. 2A is an enlarged partial vertical cross sectional view of the internal combustion engine 1 showing the shape of the auxiliary chamber 19 defined by the auxiliary chamber partition wall 9 and shapes of fuel torches forced out from the jet apertures 10 taken along a section line II-II in FIG. 2C. As used herein, the phrase "fuel torch" refers to a torch-shaped heat plume or combustion flame that is forced out of or projects from the auxiliary chamber 19 to initiate combustion in the main chamber 6. More specifically, flame propagation occurs immediately after the spark plug 8 ignites the air-fuel mixture within the auxiliary chamber 19 to initiate combustion, causing a rapid projection of combustion flame out of the auxiliary chamber 19 into the main chamber 6 through the jet apertures 10 formed in the auxiliary chamber partition wall 9. Subsequently, the ejection of torch-shaped heat plumes or flames (fuel torches) out of the auxiliary chamber 19 and the turbulence generated by this ejection both initiate and promote combustion within the main chamber 6.

As shown in FIGS. 2B and 2C, the auxiliary chamber partition wall 9 in the first embodiment includes six jet apertures 10 that open along a circumference having a center coincident with the center axis C of the auxiliary chamber 19 and the jet apertures are 10 equally spaced apart from each other by a predetermined interval (60 degrees). In addition, the jet apertures 10 extend in radial directions from the center axis C of the auxiliary chamber 19. Each of the jet apertures 10 forms a substantially cylindrical shape inside the auxiliary chamber partition wall 9, and has substantially identical length and diameter.

As mentioned above, the auxiliary chamber partition wall 9 includes the tip portion 9a that protrudes toward the main chamber 6, and the base portion 9b that is connected to the cylinder head 15. As shown in FIG. 2A, the tip portion 9a of the auxiliary chamber partition wall 9 has a wall thickness L2 that is less or thinner than a wall thickness L1 of the base portion 9b of the auxiliary chamber partition wall 9 (i.e., L2<L1). In addition, the auxiliary chamber partition wall 9 is arranged so that the transition from the base portion 9b and the tip portion 9a is smooth (i.e., the thickness of the auxiliary chamber partition wall 9 gradually decreases from the base portion 9b to the tip portion 9a).

The axial length or longitudinal length of each of the jet apertures 10 is equal to a thickness of the auxiliary chamber partition wall 9 where the jet apertures 10 are formed. Moreover, the outreach distance of the fuel torches projected from the jet apertures 10 is determined by a ratio between the radius and the length of the jet aperture 10. Therefore, the thickness of the auxiliary chamber partition wall 9 is determined so that an appropriate outreach distance of the fuel torches can be obtained. In other words, the thickness of the auxiliary chamber partition wall 9 at portions where the jet apertures 10 are formed is determined such that the projected fuel torches have an outreach distance that is sufficiently long with respect to a dimension of the main chamber 6, but such that the fuel torches do not reach (touch) a side wall of the cylinder block 16 and the piston 7.

In the example illustrated in FIG. 2A, the jet apertures 10 are formed in portions of the auxiliary chamber partition wall 9 which is adjacent to the base portion 9b, and thus, the longitudinal length of each of the jet apertures 10 is larger than the wall thickness L2 the tip portion 9a. Thus, penetration forces of the fuel torches become relatively strong, and the fuel torches can reach areas adjacent to the side wall of the cylinder block 16, which could not be reached sufficiently if the jet apertures were provided in the tip portion 9a having the thinner wall thickness L2 and the fuel torches were forced out from the tip portion 9a. Although the outreach distance of the fuel torches is relatively long, the wall thickness of the auxiliary chamber partition wall 9 at the jet apertures 10 is set such that the fuel torches do not touch the cylinder block 16 and the piston 7. Since all of the six jet apertures 10 have the same length and diameter, the flow quantity and the outreach distance of the fuel torch forced out of each of the jet apertures 10 is substantially the same.

Accordingly, with the internal combustion engine 1 having the auxiliary chamber 19 in accordance with the first embodiment of the present invention, the wall thickness L2 of the tip portion 9a of the auxiliary chamber partition wall 9 is less or thinner than the wall thickness L1 of the base portion 9b of the auxiliary chamber partition wall 9. Therefore, the thermal capacity of the tip portion 9a is smaller than the thermal capacity of the adjacent portions of the base portion 9b, and thus, thermal exchange of the tip portion 9a with fresh intake air can readily occur to cool the tip portion 9a to a prescribed equilibrium temperature. As a result, the temperature of the tip portion 9a can be prevented from rising above a constant temperature (the prescribed equilibrium temperature) and abnormal combustion induced due to premature ignition can be suppressed even in the case where the tip portion 9a is exposed to high temperature combustion gas continually when operation in the high load region continues for an extended period of time.

In addition, since the wall thickness L1 of the base portion 9b of the auxiliary chamber partition wall 9 is thicker than the wall thickness L2 of the tip portion 9a of the auxiliary chamber partition wall 9 (L1>L2), sufficient strength of the base portion 9b, which is required to be relatively strong, can be maintained even if the wall thickness of the auxiliary chamber partition wall 9 is thinned within a relatively wide range of the auxiliary chamber partition wall 9 to achieve the above mentioned heat conduction effects.

Furthermore, since the thermal capacity of the tip portion 9a and the thermal capacity of the base portion 9b are different, heat conduction from the tip portion 9a to the base portion 9b will be effectively performed. Therefore, the abnormal combustion can be further suppressed.

Also, in the first embodiment, the transition between the tip portion 9a and the base portion 9b of the auxiliary chamber partition wall 9 is smoothly arranged so that the wall thickness of the auxiliary chamber partition wall 9 gradually and continuously changes. This surface configuration of the auxiliary chamber partition wall 9 cannot only avoid local concentration of heat, but also lower an S/V (surface/volume) ratio of the auxiliary chamber 19. Therefore, heat loss resulting from depriving the heat of combustion gas by the auxiliary chamber partition wall 9 can be reduced.

As shown in FIG. 2A, the auxiliary chamber partition wall 9 in this embodiment is configured such that the jet apertures 10 are disposed in portions that are relatively closer to the base portion 9b of the auxiliary chamber partition wall 9. Therefore, it is possible to project a fuel torch from each of the jet apertures 10 which has relatively high penetration force and long outreach distance into the main chamber 6. Thus, the fuel torches can reach the adjacent areas of the outer circumference of the main chamber 6, i.e., the side wall of the cylinder block 16. As a result, combustion of fuel fragment located in the adjacent areas of the side wall of the cylinder block 16 can be promoted, thereby accomplishing combustion in the main chamber 6 as a whole which has high combustion efficiency and a reduced discharge of unburned HC.

In addition, in the first embodiment, the auxiliary chamber partition wall 9 includes several (six) jet apertures 10, which are equally spaced apart along a circumference having a center coincident with the center axis C of the auxiliary chamber 19. Therefore, the fuel torches, which are equally spaced apart in a circumferential direction with respect to the center axis C of the auxiliary chamber 19, can be projected into the main chamber 6. Thus, combustion having high combustion efficiency can be accomplished and a discharge of unburned fuel can be reduced.

Second Embodiment

Figure 3A:
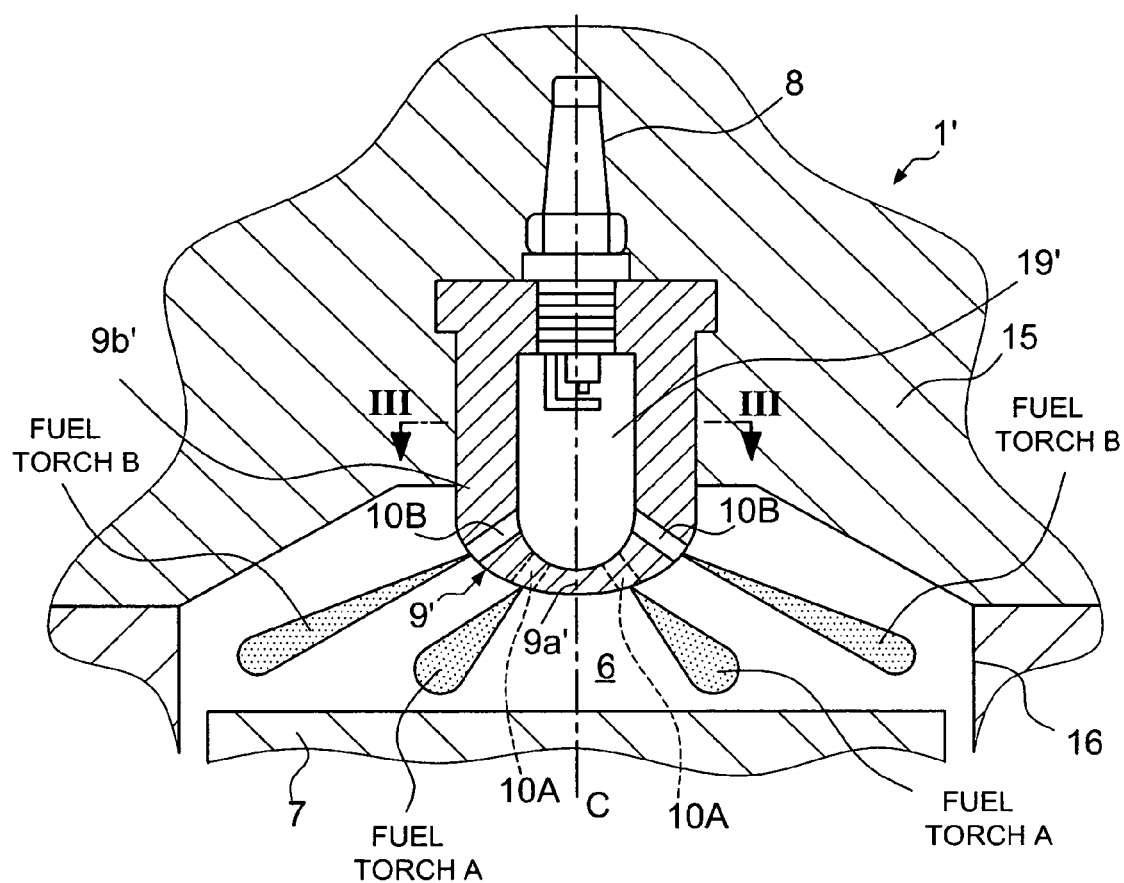
FIG. 3A is an enlarged partial vertical cross sectional view of an internal combustion engine showing a shape of an auxiliary combustion chamber defined by an auxiliary chamber partition wall and shapes of fuel torches forced out from a plurality of jet apertures in accordance with a second embodiment of the present invention.
Figure 3B:
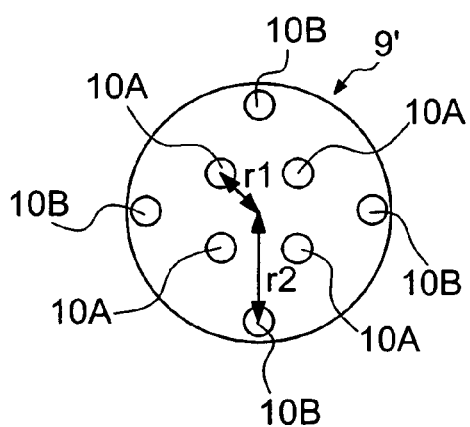
FIG. 3B is a bottom plan view of the auxiliary chamber partition wall in accordance with the second embodiment of the present invention.
Figure 3C:
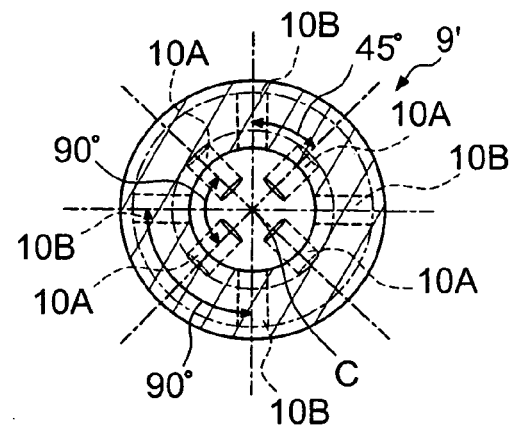
FIG. 3C is a transverse cross sectional view of the auxiliary combustion chamber taken along a section line III-III in FIG. 3A in accordance with the second embodiment of the present invention.

Referring now to FIGS. 3A to 3C, an internal combustion engine 1' with an auxiliary combustion chamber 19' in accordance with a second embodiment will now be explained. The structure of the internal combustion engine 1' of the second embodiment is identical to the structure of the internal combustion engine 1 of the first embodiment, except for the structure of an auxiliary chamber partition wall 9' that defines an auxiliary chamber 19'. In view of the similarity between the first and second embodiments, the parts of the second embodiment that are identical to the parts of the first embodiment will be given the same reference numerals as the parts of the first embodiment. Moreover, the descriptions of the parts of the internal combustion engine 1' other than the auxiliary chamber partition wall 9' of the second embodiment that are identical to the parts of the first embodiment will be omitted for the sake of brevity. The parts of the second embodiment that differ from the parts of the first embodiment will be indicated with a single prime (').

FIG. 3A is a partial vertical cross sectional view of the internal combustion engine 1' with the auxiliary chamber partition wall 9' taken along an opposing pair of jet apertures 10B shown in FIG. 3C. FIG. 3A shows the shape of the auxiliary chamber 19' formed by the auxiliary chamber partition wall 9' and the shapes of the fuel torches A and B projecting from a plurality of jet apertures 10A and 10B, respectively in accordance with the second embodiment of the present invention. FIG. 3C is a transverse cross sectional view of the auxiliary chamber partition wall 9' taken along a section line III-III in FIG. 3A.

The auxiliary chamber partition wall 9' of the second embodiment includes a first group of jet apertures 10A and a second group of jet apertures 10B that are disposed in positions radially spaced apart from the jet apertures 10A with respect to a longitudinal center axis C of the auxiliary chamber 19'. More specifically, as shown in FIG. 3B, the first group includes four jet apertures 10A that are equally spaced apart by a predetermined interval (90 degrees) along a circumference having a radius r1 with a center coincident with the longitudinal center axis C of the auxiliary chamber 19'. Likewise, the second group includes four jet apertures 10B that are equally spaced apart by a predetermined interval (90 degrees) along a circumference having a radius r2 with a center coincident with the longitudinal center axis C of the auxiliary chamber 19'. The first group of the jet apertures 10A and the second group of the jet apertures 10B are arranged such that an adjacent pair of the jet apertures 10A and 10B are offset in the circumferential direction by a predetermined interval (45 degrees) as seen in FIG. 3C in order to prevent the projection directions of the fuel torques A and B ejected from the jet apertures 10A and 10B from aligning with each other. In other words, imaginary radial lines obtained by extending center axes of the jet apertures 10A and 10B to pass trough the longitudinal center axis C of the auxiliary chamber 19' are offset from each other in the circumferential direction as viewed in a plane perpendicular to the longitudinal center axis C of the auxiliary chamber 19' as shown in FIG. 3C. As seen in FIG. 3B, the jet apertures 10A are disposed with respect to the jet apertures 10B so that the jet apertures 10A open to the main chamber 6 in positions that are radially inward of positions where the jet apertures 10B open to the main combustion chamber 6.

Each of the jet apertures 10A and 10B of the first and second groups has the same diameter. However, the longitudinal length of the first group of the jet apertures 10A is different from the longitudinal length of the second group of the jet apertures 10B because, similarly to the first embodiment, the auxiliary chamber partition wall 9' is arranged such that a wall thickness thereof gradually decreases from a base portion 9b' to a tip portion 9a'. Since the jet apertures 10A are formed in positions that are radially spaced apart from the jet apertures 10B, the portions of the auxiliary chamber partition wall 9' where the jet apertures 10A are formed have a different wall thickness from the portions where the jet apertures 10B are formed. In the second embodiment of the present invention, the jet apertures 10A have the longitudinal length that is shorter than the longitudinal length of the jet apertures 10B because the jet apertures 10A are arranged at the positions that are closer to the tip portion 9a' than the positions where the jet apertures 10B are arranged. Therefore, the fuel torches B project from the jet apertures 10B with a stronger penetration force than the fuel torches A projecting from the jet apertures 10, and thus, the fuel torches B have a longer outreach distance. More specifically, the thickness of the auxiliary chamber partition wall 9' is determined so that the jet apertures 10B are arranged to project the fuel torches B that reach areas adjacent to the side wall of the cylinder block 16 similarly to the fuel torches of the first embodiment. The thickness of the auxiliary chamber partition wall 9' is determined so that the jet apertures 10A are arranged to project the fuel torches A that have a relatively weak penetration force to prevent the fuel torches A from reaching (touching) a crown surface of the piston 7.

With the internal combustion engine 1' of the second embodiment, as illustrated in FIG. 3A, since the jet apertures 10A are disposed in positions closer to the tip portion 9a' of the auxiliary chamber 19', the longitudinal length of the jet apertures 10A is relatively short. Thus, the fuel torches A projected from the jet apertures 10A have a relatively weak penetration force, and thus, do not collide against the crown surface of the piston 7. Therefore, with this arrangement, a cooling loss due to the fuel torches A colliding against the crown surface of the piston 7 can be avoided as well as combustion of the air-fuel mixture in the center portion of the main chamber 6 can be promoted.

In addition, since the jet apertures 10A and the jet apertures 10B are formed in positions of the auxiliary chamber partition wall 9' that are radially spaced apart with different wall thicknesses, the fuel torches A and B with different penetration forces can be projected from the jet apertures 10A and the jet apertures 10B, respectively. Therefore, a desired combustion can be accomplished in the main chamber 6.

More specifically, in the second embodiment, the jet apertures 10A are provided in positions of the auxiliary chamber partition wall 9' having a wall thickness such that the fuel torches A project from the jet apertures 10A with a relatively weak penetration force to prevent the fuel torches A from colliding against the crown surface of the piston 7. On the other hand, the jet apertures 10B are provided in positions of the auxiliary chamber partition wall 9' having a wall thickness such that the fuel torches B project from the jet apertures 10B with a relatively strong penetration force so that the fuel torches B reach the areas adjacent to the side wall of the cylinder block 16 without colliding against the side wall of the cylinder block 16. Therefore, homogeneous combustion of the air-fuel mixture can be obtained inside the entire main chamber 6.

Moreover, in the second embodiment, the outreach distance of the fuel torches A projecting from the jet apertures 10A is different from the outreach distance of the fuel torches B projecting from the jet apertures 10B by arranging the longitudinal distance of the jet apertures 10A to be different from the longitudinal distance of the jet apertures 10B. Therefore, the jet apertures 10A and the jet apertures 10B can be made with the same diameter. Thus, processing (manufacturing) of the jet apertures 10A and 10B can be facilitated, which is advantageous in manufacturing process.

Furthermore, the four jet apertures 10A and the four jet apertures 10B are provided such that adjacent jet apertures 10A and 10B are offset in the circumferential direction by a predetermined angle. Therefore, the projection direction of the fuel torches A and B can be evenly distributed in the circumferential direction as well as in the radial direction with respect to the center axis C of the auxiliary combustion chamber 19'. Therefore, it is possible to spread the projected fuel torches A and B over a wide three-dimensional range within the main chamber 6.

Third Embodiment

Figure 4A:
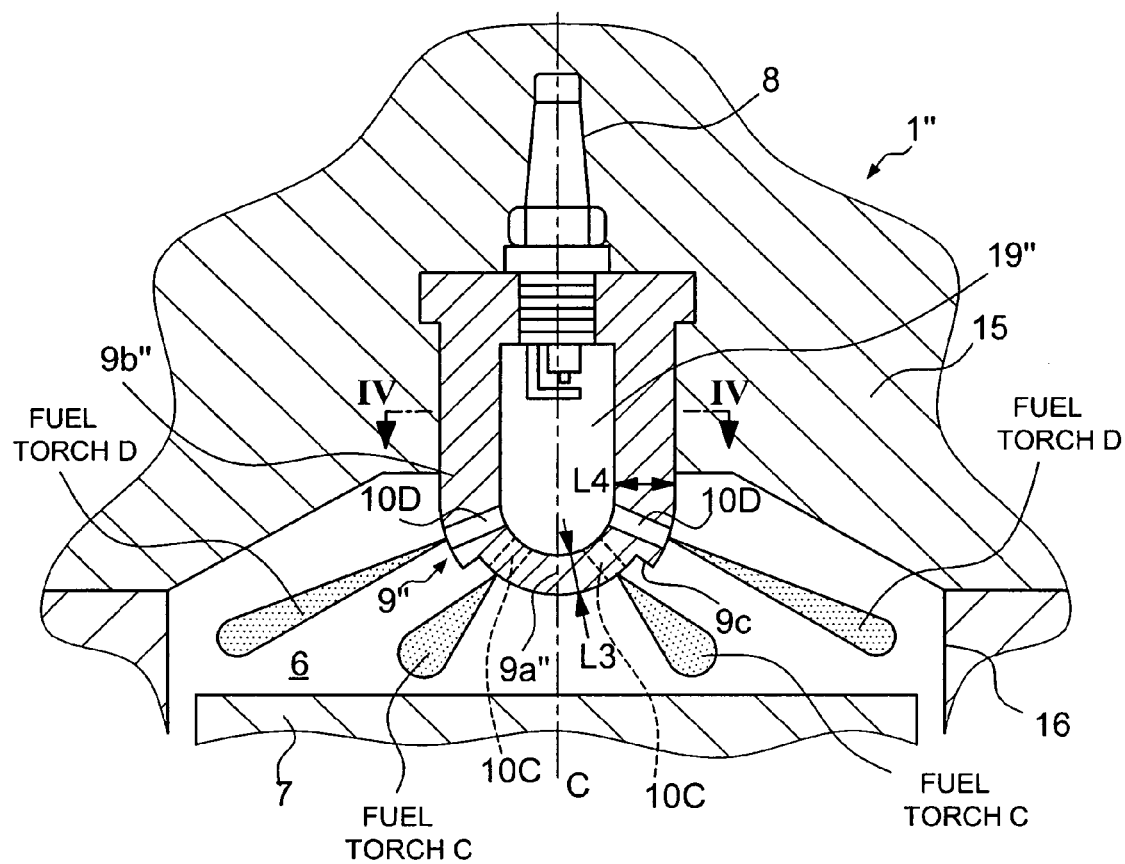
FIG. 4A is an enlarged partial vertical cross sectional view of an internal combustion engine showing a shape of an auxiliary combustion chamber defined by an auxiliary chamber partition wall and shapes of fuel torches forced out from a plurality of jet apertures in accordance with a third embodiment of the present invention.
Figure 4B:
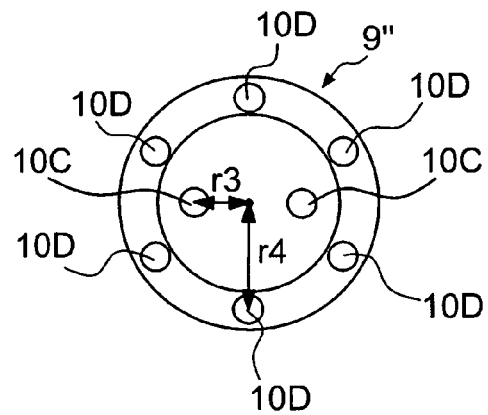
FIG. 4B is a bottom plan view of the auxiliary chamber partition wall in accordance with the third embodiment of the present invention.
Figure 4C:
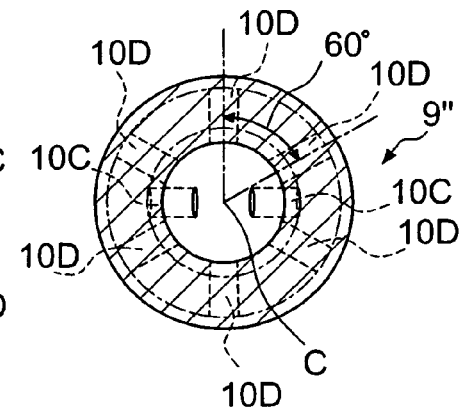
FIG. 4C is a transverse cross sectional view of the auxiliary combustion chamber taken along a section line IV-IV in FIG. 4A in accordance with the third embodiment of the present invention.

Referring now to FIGS. 4A to 4C, an internal combustion engine 1" with an auxiliary combustion chamber 19" in accordance with a third embodiment will now be explained. The structure of the internal combustion engine 1" of the third embodiment is identical to the structure of the internal combustion engine 1 of the first embodiment, except for the structure of an auxiliary chamber partition wall 9" that defines an auxiliary chamber 19". In view of the similarity between the first, second and third embodiments, the parts of the third embodiment that are identical to the parts of the first and second embodiments will be given the same reference numerals as the parts of the first embodiment. Moreover, the descriptions of the parts of the internal combustion engine 1" other than the auxiliary chamber partition wall 9" of the third embodiment that are identical to the parts of the first and second embodiments will be omitted for the sake of brevity. The parts of the third embodiment that differ from the parts of the first and second embodiments will be indicated with a double prime (").

FIG. 4A is a partial vertical cross sectional view of the internal combustion engine 1" with the auxiliary chamber partition wall 9" taken along an opposing pair of jet apertures 10D shown in FIG. 4C. FIG. 4A shows the shape of the auxiliary chamber 19" formed by the auxiliary chamber partition wall 9" and the shapes of the fuel torches C and D projecting from a plurality of jet apertures 10D and 10C, respectively, in accordance with the third embodiment of the present invention. FIG. 4C is a transverse cross sectional view of the auxiliary chamber partition wall 9" taken along a section line IV-IV in FIG. 4A.

As shown in FIG. 4A, the auxiliary chamber partition wall 9" of the third embodiment includes a step portion 9c on an outer surface that faces the main chamber 6 at a location between a tip portion 9a" and a base portion 9b". More specifically, the step portion 9c is provided such that a wall thickness L3 of the tip portion 9a" is thinner (or smaller) than a wall thickness L4 of the base portion 9b". In the third embodiment, an area between the tip portion 9a" and the step portion 9c has a uniform wall thickness (the wall thickness L3) and an area between the step portion 9c and the base portion 9b" has a uniform wall thickness (the wall thickness L4). Thus, the step portion 9c forms a stepwise transition between the wall thickness L3 and the wall thickness L4. Therefore, in the third embodiment, the area adjacent to the tip portion 9a" having a relatively thin wall thickness (L3) can expand in a relatively wide range of the auxiliary chamber partition wall 9". This structure of the tip portion 9a", the base portion 9b" and the step portion 9c can be obtained by, for example, cutting out the adjacent area of the tip portion 9a" on the surface of the auxiliary chamber partition wall 9" that faces the main chamber 6 after the auxiliary chamber partition wall 9" having the uniform thickness L4 is formed.

In addition, the auxiliary chamber partition wall 9" of the third embodiment includes a first group of the jet apertures 10C and a second group of the jet apertures 10D. The first group includes two jet apertures 10C that are equally spaced apart by a predetermined interval (180 degrees) along a circumference having a radius r3 with a center coincident with a longitudinal center axis C of the auxiliary chamber 19". The second group includes six jet apertures 10D that are equally spaced apart by a predetermined interval (60 degrees) along a circumference having a radius r4 with a center coincident with a longitudinal center axis C of the auxiliary chamber 19". In the third embodiment, the step portion 9c is positioned between the first group of the jet apertures 10C and the second group of the jet apertures 10D. Therefore, the longitudinal length of the jet apertures 10C is different from the longitudinal length of the jet apertures 10D because the wall thickness L3 of the portion where the jet apertures 10C are formed is different from the wall thickness L4 of the portion where the jet apertures 10D are formed.

In the third embodiment of the present invention, the jet apertures 10C and 10D are arranged such that adjacent jet apertures 10C and 10D are offset in the circumference direction by a predetermined interval (30 degrees). Thus, the projection directions of the fuel torches C and D ejected from the jet apertures 10C and 10D, respectively, can be prevented from overlapping with each other. Each of the jet apertures 10C and 10D has the same diameter. Moreover, the jet apertures 10C are arranged such that the fuel torches C ejected from the jet apertures 10C are generally directed toward the intake port 2 and the exhaust port 13 (FIG. 1), respectively.

The auxiliary chamber partition wall 9" is arranged such that the fuel torches C, which are ejected from the jet apertures 10C formed adjacent to the tip portion 9a" of the auxiliary chamber partition wall 9", have a relatively weak penetration force, and thus, the fuel torches C do not collide against the crown surface of the piston 7. On the other hand, the auxiliary chamber partition wall 9" is arranged such that the fuel torches D, which are ejected from the jet apertures 10D formed adjacent to the base portion 9b", have a relatively strong penetration force, and thus, the fuel torches D can reach the areas adjacent to the side wall of the cylinder block 16. This relationship between the fuel torches C and D are similar to the relationship between the fuel torches A and B in the second embodiment.

Accordingly, in the internal combustion engine 1" in accordance with the third embodiment of the present invention, the step portion 9c is provided between the base portion 9b" and the tip portion 9a" to change the wall thickness L3 of the tip portion 9a" from the wall thickness L4 of the base portion 9b". Therefore, the area including the tip portion 9a" with a relatively thin wall thickness (L3) can extend in a relatively large area of the auxiliary chamber partition wall 9". Thus, the thermal capacity of the auxiliary chamber partition wall 9" in the area of the tip portion 9a" can be further reduced.

Since the step portion 9c is provided on the surface of the auxiliary chamber partition wall 9" that faces the main chamber 6, the manufacturing process of the auxiliary chamber partition wall 9" including the base portion 9b" and the tip portion 9a" can be made relatively simple. In other words, the tip portion 9a" can be formed by cutting out an appropriate portion of the auxiliary chamber partition wall 9" from the outer side of the auxiliary chamber partition wall 9". Also, by forming the step portion 9c on the surface of the auxiliary chamber partition wall 9" that faces the main chamber 6, an inner surface of the auxiliary chamber partition wall 9" (the surface defining the auxiliary chamber 19") can be arranged as a smooth surface. Therefore, the fuel torches C and D can be efficiently projected from the auxiliary chamber 19".

As shown in FIG. 4A, the auxiliary chamber partition wall 9" of the third embodiment includes the jet apertures 10C that are disposed in the tip portion 9a". Thus, the penetration force of the fuel torches C ejected from the jet apertures 10C having a relatively short longitudinal distance is relatively weak, and thus, the fuel torches C can be prevented from colliding against the crown surface of the piston 7. Therefore, a cooling loss due to the fuel torches C colliding against the crown surface of the piston 7 can be avoided as well as combustion of the air-fuel mixture in the center portion of the main chamber 6 can be promoted.

In addition, since the auxiliary chamber partition wall 9" of the third embodiment includes the jet apertures 10D that are disposed in the base portion 9b", the fuel torches D are ejected from the jet apertures 10D with a relatively strong penetration force. Therefore, the fuel torches D can reach the areas adjacent to the side wall of the cylinder block 16.

Moreover, since the jet apertures 10D are formed in the area adjacent to the base portion 9b" and the jet apertures 10C are formed in the area adjacent to the tip portion 9a", the auxiliary chamber partition wall 9" is provided with the jet apertures 10C and 10D throughout an area from the tip portion 9a" to the base portion 9b". Therefore, combustion of the air-fuel mixture inside the main chamber 6 as a whole can be effectively conducted.

Similarly to the second embodiment, in the third embodiment, the outreach distance of the fuel torches C projecting from the jet apertures 10C is different from the outreach distance of the fuel torches D projecting from the jet apertures 10D by arranging the longitudinal length of the jet apertures 10C to be different from the longitudinal length of the jet apertures 10D. Therefore, the jet apertures 10C and the jet apertures 10D can be made with the same diameter. Thus, processing (manufacturing) of the jet apertures 10A and 10B can be facilitated, which is advantageous in manufacturing process.

Furthermore, the jet apertures 10C are provided such that the fuel torches C are projected generally in directions toward the intake port 2 and the exhaust port 13, respectively. Therefore, the projected fuel torches C can effectively combust fresh air introduced from the intake port 2 into the main chamber 6.

Fourth Embodiment

Referring now to FIGS. 5A to 5C, an internal combustion engine 1''' with auxiliary combustion chamber in accordance with a fourth embodiment will now be explained. The structure of the internal combustion engine 1''' of the fourth embodiment is identical to the structure of the internal combustion engine 1 of the first embodiment, except for the structure of an auxiliary chamber partition wall 9''' that defines an auxiliary chamber 19'''. In view of the similarity between the first through fourth embodiments, the parts of the internal combustion engine 1''' other than the auxiliary chamber partition wall 9''' of the fourth embodiment that are identical to the parts of the first through third embodiments will be given the same reference numerals as the parts of the first through third embodiments. Moreover, the descriptions of the parts of the fourth embodiment that are identical to the parts of the first through third embodiments will be omitted for the sake of brevity. The parts of the fourth embodiment that differ from the parts of the first through third embodiments will be indicated with a triple prime ('''').

FIG. 5A is a partial vertical cross sectional view of the internal combustion engine 1''' with the auxiliary chamber partition wall 9''' taken along an opposing pair of jet apertures 10F shown in FIG. 5C. FIG. 5A shows the shape of the auxiliary chamber 19''' formed by the auxiliary chamber partition wall 9''' and the shapes of the fuel torches E and F projecting from a plurality of jet apertures 10E and 10F, respectively, in accordance with the fourth embodiment of the present invention. FIG. 5C is a transverse cross sectional view of the auxiliary chamber partition wall 9''' taken along a section line V-V in FIG. 5A.

Similarly to the third embodiment, the auxiliary chamber partition wall 9''' of the fourth embodiment includes a step portion 9d between a tip portion 9a''' and a base portion 9b'''. Moreover, as in the third embodiment, the step portion 9d is formed as a stepwise transition between an area including the base portion 9b''' having a uniform wall thickness L6 and an area including the tip portion 9a''' having a uniform wall thickness L5. However, the fourth embodiment of the present invention differs from the third embodiment in that the step portion 9d in the fourth embodiment is formed on an inner surface of the auxiliary chamber partition wall 9''' that faces the auxiliary chamber 19'''.

Moreover, in the fourth embodiment, the auxiliary chamber partition wall 9''' includes a first group of the jet apertures 10E and a second group of the jet apertures 10F. The first group includes six jet apertures 10E that are equally spaced apart by a predetermined interval (60 degrees) along a circumference having a radius r6 with a center coincident with a longitudinal center axis C of the auxiliary chamber 19'''. The second group includes a pair of jet apertures 10F that are equally spaced apart by a predetermined interval (180 degrees) along a circumference having a radius r5 with a center coincident with a longitudinal center axis C of the auxiliary chamber 19'''.

Similarly to the third embodiment, in the fourth embodiment, the step portion 9d is positioned between the first group of the jet apertures 10E and the second group of the jet apertures 10F. Therefore, the longitudinal length of the jet apertures 10E is different from the longitudinal length of the jet apertures 10F because the wall thickness L5 of the portion where the jet apertures 10E are formed is different from the wall thickness L6 of the portion where the jet apertures 10F are formed.

Furthermore, in the fourth embodiment of the present invention, the jet apertures 10E and 10F are arranged such that an adjacent jet apertures 10E and 10F are offset in the circumference direction by a predetermined interval (30 degrees). Thus, the projection directions of the fuel torches E and F ejected from the jet apertures 10E and 10F, respectively, can be prevented from overlapping with each other. Each of the jet apertures 10E and 10F has the same diameter. Moreover, the jet apertures 10F are arranged such that the fuel torches F ejected from the jet apertures 10F are generally directed toward the intake port 2 and the exhaust port 13 (FIG. 1), respectively.

The auxiliary chamber partition wall 9''' is arranged such that the fuel torches E, which are ejected from the jet apertures 10E formed adjacent to the tip portion 9*a*''' of the auxiliary chamber partition wall 9''', have a relatively weak penetration force, and thus, the fuel torches E do not collide against the crown surface of the piston 7. On the other hand, the auxiliary chamber partition wall 9''' is arranged such that the fuel torches F, which are ejected from the jet apertures 10F formed adjacent to the base portion 9*b*''', have a relatively strong penetration force, and thus, the fuel torches F can reach the areas adjacent to the side wall of the cylinder block 16. This relationship between the fuel torches E and F are similar to the relationship between the fuel torches C and D in the second embodiment.

Accordingly, in the internal combustion engine 1''' in accordance with the fourth embodiment of the present invention, the step portion 9*d* is provided between the base portion 9*b*''' and the tip portion 9*a*''' to change the wall thickness L5 of the tip portion 9*a*''' from the wall thickness L6 of the base portion 9*b*'''. Therefore, an area including the tip portion 9*a*''' with a relatively thin wall thickness (L5) can extend in a relatively large area of the auxiliary chamber partition wall 9'''. Thus, the thermal capacity of the auxiliary chamber partition wall 9''' in the area of the tip portion 9*a*''' can be further reduced.

Also, by forming the step portion 9*d* on the inner surface of the auxiliary chamber partition wall 9''' that faces the auxiliary chamber 19''', an outer surface of the auxiliary chamber partition wall 9''', which faces the main chamber 6, can be arranged as a smooth surface. Therefore, concentration of heat that has been generated by combustion within the main chamber 6 can be avoided, and disturbance of gas flow within the main chamber 6 can also be avoided.

Moreover, by forming the step portion 9*d* on the inner surface of the auxiliary chamber partition wall 9''' that faces the auxiliary chamber 19''', the volume or capacity of the auxiliary chamber 19''' can be expanded. Thus, the fuel torches E and F can be projected with a relatively stronger penetration force comparing to a conventional auxiliary chamber 19''' having the same diameter.

Furthermore, the jet apertures 10F are provided such that the fuel torches F are projected generally in directions toward the intake port 2 and the exhaust port 13, respectively. Therefore, the projected fuel torches F can effectively combust fresh air introduced from the intake port 2 into the main chamber 6.

Although several arrangements of the jet apertures are explained in the first through fourth embodiments above, the arrangements of the jet apertures are not limited to such arrangements. More specifically, the effect of the present invention can be obtain when the jet apertures are arranged differently, for example, as shown in FIG. 6A or FIG. 6B.

Figure 6A:
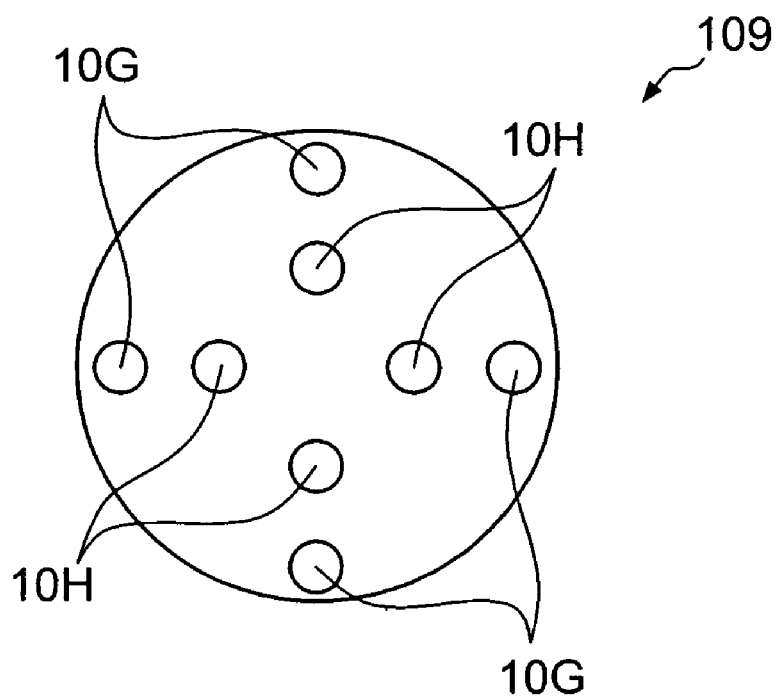
FIG. 6A is a bottom plan view of an auxiliary chamber partition wall showing a first alternative arrangement of a plurality of jet apertures.
Figure 6B:
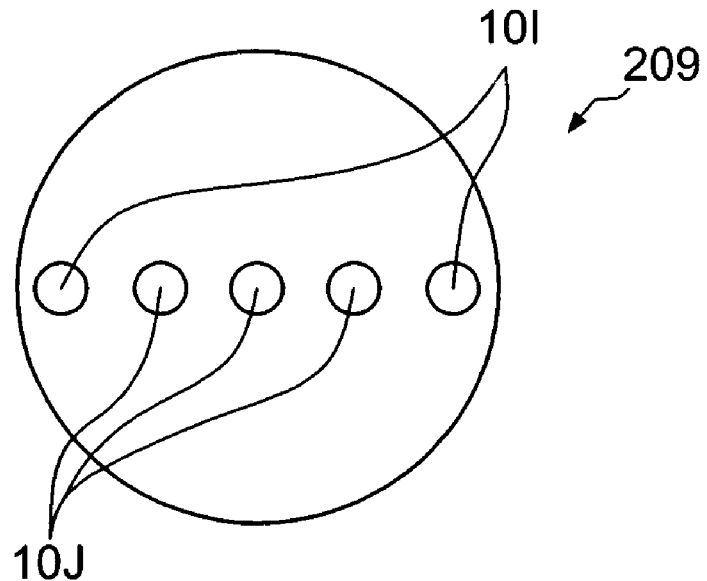
FIG. 6B is a bottom plan view of an auxiliary chamber partition wall showing a second alternative arrangement of a plurality of jet apertures.

More specifically, in the alternative arrangement of jet apertures 10G and 10H illustrated in FIG. 6A, the longitudinal length of the jet apertures 10G is set longer than the longitudinal length of the jet apertures 10H by forming the jet apertures 10G adjacent to a base portion of an auxiliary chamber partition wall 109 having a larger wall thickness and forming the jet apertures 10H adjacent to a tip portion of the auxiliary chamber partition wall 109 having a smaller wall thickness. Likewise, in the alternative arrangement of jet apertures 10I and 10J illustrated in FIG. 6B, the longitudinal length of the jet apertures 10I is set longer than the longitudinal length of the jet apertures 10J by forming the jet apertures 10I adjacent to a base portion of an auxiliary chamber partition wall 209 having a larger wall thickness and forming the jet apertures 10J adjacent to a tip portion of the auxiliary chamber partition wall 209 having a smaller wall thickness.

Accordingly, the longitudinal lengths of the jet apertures 10H and 10G, or 10I and 10J (and the penetration forces of the projected fuel torches) can be varied by changing the wall thickness of the auxiliary chamber partition wall 109 or 209. Thus, the fuel torch having a relatively strong penetration force to reach the area adjacent to the side wall of the cylinder block 16 and the fuel torch having a relatively weak penetration force to avoid colliding against the crown surface of the piston 7 can be simultaneously obtained in accordance with the present invention. Accordingly, the internal combustion engine with auxiliary combustion chamber of the present invention can perform effective combustion of the air-fuel mixture both in the low load region in which the fuel injection amount is small and the torch combustion is effective, and in the high load region in which the total fuel injection amount is larch which sometime causes premature ignition.

In the first through fourth embodiment, the fuel injection valve 3 is provided in the intake port 2 to inject fuel into the intake port 2 (so-called MPI method). However, the effect of the present invention can also be obtained when the present invention is applied to a direct fuel injection engine in which the fuel injection valve is disposed inside the cylinder. In such case, the fuel injection valve is usually disposed in a generally upper center portion of the main combustion chamber, but instead, the fuel injection valve may be disposed adjacent to a peripheral side wall of the main combustion chamber.

In addition, the effect of the present invention can also be obtained when a reforming fuel such as hydrogen or reforming gas is introduced into the auxiliary chamber 19''' in addition to the air-fuel mixture in order to boost penetration force of the fuel torches and to increase combustion speed inside the main chamber.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine comprising:
a cylinder block;
a clinder head disposed on an upper part of the cylinder block;
a piston disposed inside the cylinder block so that a main combustion chamber is defined by cylinder head, the cylinder block and the piston;
an auxiliary chamber partition wall coupled to the cylinder head and extending toward the main chamber to form an auxiliary combustion chamber inside an area enclosed by the auxiliary chamber partition wall; and
an ignition section configured and arranged to ignite air-fuel mixture within the auxiliary combustion chamber,
the auxiliary chamber partition wall having a first portion with a plurality of first jet apertures configured and arranged to project a plurality of first fuel torches toward the piston and a second portion with plurility of second jet apertures configured and arranged to project a plurality of second fuel torches toward the cylinder block when a fuel inside the auxiliary combustion chamber is ignited by the ignition section, the first portion of the auxiliary chamber partition wall having a smaller wall thickness than the second portion of the auxiliary chamber partition wall.

2. The internal combustion engine as recited in claim 1, wherein
at least a portion of the auxiliary chamber partition wall that faces toward the piston has a smaller wall thickness than the first portion and the second portion, and the auxiliary combustion chamber fluidly communicates with the main combustion chamber through the plurality of first jet apertures and the plurality of second jet apertures.

3. The internal combustion engine as recited in claim 2, wherein
the auxiliary chamber partition wall includes a tip portion that protrudes toward the piston with the tip portion having the wall thickness that is smaller than the wall thickness of a portion of the auxiliary chamber partition wall other than the tip portion.

4. The internal combustion engine as recited in claim 2, wherein
the auxiliary chamber partition wall includes a base portion that is connected to the cylinder head and a tip portion that protrudes from the base portion toward the piston with the tip portion having a smaller wall thickness than the base portion.

5. The internal combustion engine as recited in claim 4, wherein
the auxiliary chamber partition wall is arranged such that a wall thickness of the auxiliary chamber partition wall gradually decreases from the base portion to the tip portion.

6. The internal combustion engine as recited in claim 5, one of the plurality of first jet apertures and plurality of second jet apertures is formed in the auxiliary chamber partition wall adjacent to the tip portion.

7. The internal combustion engine as recited in claim 4, wherein
one of the plurality of first jet apertures and the plurality of second jet apertures is formed in the auxiliary chamber partition wall adjacent to the base portion.

8. The internal combustion engine as recited in claim 2, wherein
the auxiliary chamber partition wall is arranged such that the auxiliary combustion chamber is formed in an upper center part of the main combustion chamber, and
the plurality of first jet apertures and plurality of second jet apertures are disposed equally spaced apart on the first and second circumferences, respectively.

9. An internal combustion engine comprising:
a cylinder block;
a cylinder head disposed on an upper part of the cylinder block;
a piston disposed inside the cylinder block so that a main combustion chamber is difined by the cylinder head, the cylinder block and the piston;
an auxiliary chamber partition wall coupled to the cylinder head and extending toward the main chamber to form an suxiliary combustion chamber inside an area enclosed by the auxiliary chamber partition wall, with at least a portion of the auxiliary chamber parition wall that faces toward the piston having a smaller wall thickness than other portion of the auxiliary chamber partition wall at which at least one jet aperture is formed, the auxiliary combustion chamber fluidly communicating with the main combustion chamber through the jet aperture; and
a spark plug configured and arranged to ignite air-fuel mixture within the auxiliary combustion chamber,
the auxiliary chamber partition wall including a base portion that is connected to the cylinder head, a tip portion that protrudes from the base portion toward the piston with the tip portion having a smaller wall thickness than the base portion and a step portion disposed between the tip portion and the base portion with the step portion including a side face extending in a thickness direction of the auxiliary cahmber partition wall, the at least one jet aperture includes a plurality of first apertures disposed on the tip portion and a plurality of second apertures disposed on the base portion.

10. The internal combustion engine as recited in claim 9, wherein
the step portion of the auxiliary chamber partition wall is disposed on an outer surface of the auxiliary chamber partition wall that faces the main combustion chamber. the main chamber to form an auxiliary combustion chamber inside an area enclosed by the ne of the plurality of first jet apertures and the plurality of second jet apertures is formed in the auxiliary chamber partition wall adjacent to the base portion.

11. The internal combustion engine as recited in claim 9, the step portion of the auxiliary cahmber partition wall is disposed on an inner surface of the auxiliary chamber partition wall that faces the main combustion cahmber.

12. The internal combustion engine as recited in claim 9, wherein, the jet aperture is formed on a side of the base portion of the auxiliary chamber partition wall with respect to the step portion.

13. The internal combustion engine as recited in claim 9, wherein
the jet aperture is formed on a side of the tip portion of the auxiliary chamber partition wall with respect to the step portion.

14. An internal combustion engine comprising:
a cylinder block;
a cylinder head disposed on an upper part of the cylinder block;
a piston disposed inside the cylinder block so that a main combustion chamber is defined by the cylinder head, the cylinder block and the piston;
an auxiliary chamber partition wall coupled to the cylinder head and extending toward the main chamber to form an auxiliary combustion chamber inside an area enclosed by the auxiliary chamber partition wall, with at least a portion of the auxiliary chamber partition wall that faces toward the piston having a smaller wall thickness than other portion of the auxiliary chamber partition wall, the auxiliary chamber partition wall having a plurality of first jet apertures and a plurality of second jet apertures through which the auxiliary combustion chamber fluidly communicates with the main combustion chamber, the plurality of first jet apertures and the plurality of second jet apertures disposed on first and second circumferences having a center coincident with a longitudinal axis of the auxiliary combustion chamber, respectively, the second circumference being radially offset from the first circumference, the first and second circumference having different wall thicknesses; and
a spark plug configured and arranged to ignite air-fuel mixture within the auxiliary combustion chamber.

15. The internal combustion engine as recited in 9, wherein the auxiliary chamber partition wall is arranged such that the auxiliary combustion chamber is formed in an upper center part of the main combustion chamber, and
the first jet apertures are disposed on a first circumference having a center coincident with a longitudinal axis of the auxiliary combustion chamber and the second jet apertures are disposed on a second circumference having a center coincident with the longitudinal axis of the auxiliary combustion chamber with the second circumference being radially offset from the first circumference.

16. An internal combustion engine comprising:
a cylinder block;
a cylinder head disposed on an upper part of the cylinder block;
a piston disposed inside the cylinder block so that a main combustion chamber is defined by the cylinder head, the cylinder block and the piston;
an auxiliary chamber partition wall coupled to the cylinder head and extending toward the main chamber to form an auxiliary combustion chamber inside an area enclosed by the auxiliary chamber partition wall, with at least a portion of the auxiliary chamber partition wall that faces toward the piston having a smaller wall thickness than other portion of the auxiliary chamber partition wall at which at least one jet aperture is formed, the auxiliary combustion chamber fluidly communicating with the main combustion chamber through the jet aperture, the auxiliary chamber partition wall being arranged such that the auxiliary combustion chamber is formed in an upper center part of the main combustion chamber; and
a spark plug configured and arranged to ignite air-fuel mixture within the auxiliary combustion chamber,
the auxiliary chamber partition wall including a base portion that is connected to the cylinder head, a tip portion that protrudes from the base portion toward the piston with the tip portion having a smaller wall thickness than the base portion and a step portion disposed between the tip portion and the base portion with the step portion including a side face extending in a thickness direction of the auxiliary chamber partition wall,
the at least one jet aperture including a plurality of first jet apertures and a plurality of second jet apertures with the first jet apertures being disposed on a side of the tip portion and the second jet apertures disposed on a side of the base portion with respect to the step portion,
the first and second jet apertures being formed in the auxiliary chamber partition wall such that the first jet apertures are disposed on a first circumference having a center coincident with a longitudinal axis of the auxiliary combustion chamber and the second jet apertures are disposed on a second circumference having a center coincident with the longitudinal axis of the auxiliary combustion chamber with the second circumference being radially offset from the first circumference,
the first jet apertures being equally spaced apart on the first circumference and the second jet apertures being equally spaced apart on the second circumference, the first jet apertures being offset from the second jet apertures in a circumference direction with respect to the longitudinal center axis of the auxiliary combustion chamber.

17. An internal combustion engine comprising:
combustion chamber means for generating a main combustion of a fresh air-fuel mixture; and
auxiliary combustion chamber means for generating a preliminary combustion of the fresh air-fuel mixture to ignite the fresh air-fuel mixture in the main combustion chamber means with a tip portion of the auxiliary combustion chamber means facing the piston having a smaller thermal capacity than first and second portions of the auxiliary chamber forming means at which a plurality of first fuel torches and a plurality of second fuel torches are projected, respectively, the first portion of the auxiliary chamber forming means having a smaller thermal capacity than the second portion of the auxiliary chamber forming means.

* * * * *